United States Patent
Bravdo et al.

(12)

(10) Patent No.: US 6,185,833 B1
(45) Date of Patent: Feb. 13, 2001

(54) LEAF THICKNESS SENSING DEVICE

(75) Inventors: Ben-Ami Bravdo, Rehovot; Yehoshua Sharon, Ichud; Ron Seliemann, Tel Aviv, all of (IL)

(73) Assignee: Yissum Research Development Company of the Hebrew University of Jerusalem, Jerusalem (IL)

( * ) Notice: Under 35 U.S.C. 154(b), the term of this patent shall be extended for 0 days.

(21) Appl. No.: 09/355,493

(22) PCT Filed: Jan. 27, 1998

(86) PCT No.: PCT/IL98/00040

§ 371 Date: Feb. 11, 2000

§ 102(e) Date: Feb. 11, 2000

(87) PCT Pub. No.: WO98/33037

PCT Pub. Date: Jul. 30, 1998

(51) Int. Cl.[7] .................. G01B 5/02; G01B 7/02
(52) U.S. Cl. ............... 33/783; 33/787; 33/DIG. 13; 73/73
(58) Field of Search .............. 33/347, 501.02, 33/501.03, 783, 787, DIG. 13; 73/73, 855, 856

(56) References Cited

U.S. PATENT DOCUMENTS

| 2,416,664 | 2/1947 | Ruge . | |
|---|---|---|---|
| 3,543,568 | * 12/1970 | Russell | 73/855 |
| 3,826,487 | 7/1974 | Förster et al. . | |
| 4,026,467 | * 5/1977 | Aymé de la Chevreliére | 73/73 |
| 4,163,550 | 8/1979 | Armstrong . | |
| 4,189,841 | 2/1980 | Loepfe . | |
| 4,313,172 | 1/1982 | Baumans et al. . | |
| 4,513,608 | * 4/1985 | Cuming | 73/73 |
| 4,638,594 | 1/1987 | Huguet et al. . | |
| 4,702,931 | 10/1987 | Falcoff . | |
| 4,750,368 | 6/1988 | Shearer et al. . | |
| 5,208,997 | 5/1993 | Tas . | |
| 5,341,673 | * 8/1994 | Burns et al. | 73/73 |
| 6,058,647 | * 5/2000 | Emalfarb | 73/73 |

FOREIGN PATENT DOCUMENTS

| 2170908 | 8/1986 | (GB) . |
|---|---|---|
| 56-056445 | 5/1981 | (JP) . |
| 1105155 | 7/1984 | (SU) . |
| 1833126 | 6/1991 | (SU) . |

OTHER PUBLICATIONS

Sharon, et al., "Irrigation Control fo Citrus According to the Diurnal Cycling of Leaf Thickness", Proceedings of International Conference on Water & Irrigation, Tel Aviv, Israel (1996).

Falk, et al., "On the Relation between Turgor Pressure and Tissue Rigidity", Physiol.Plant., 11:802–817 (1958).

Syvertsen, et al., "Diurnal Changes in Citrus Leaf Thickness, Leaf Water Potential and Leaf to Air Temperature Difference", J. Exp. Bot., 33 (135):783–789 (1982).

Bielorai, "Beta–ray Gauging Technique for Measuring Water Content Changes of Citrus Seedings as Affected by the Moisture Status of the Soil", J. Exp. Bot., 489–495 (1960).

* cited by examiner

Primary Examiner—G. Bradley Bennett
(74) Attorney, Agent, or Firm—Fish & Richardson P.C.

(57) ABSTRACT

A leaf thickness sensing device (1) having mounting apparatus (9, 10) for flexibly mounting the device adjacent a leaf whose thickness is to be sensed, a leaf support element (4) coupled to the mounting apparatus, a displaceable leaf abutting (6) juxtaposed with respect to and biased towards the leaf support element so as to be in firm, non-destructive abutting contact with a leaf to be releasably retained on the leaf support element; a displacement transducer element (11) responsibly coupled to the leaf abutting element and serving to generate a signal corresponding to displacement of the second element relative to the first element.

5 Claims, 1 Drawing Sheet

LEAF THICKNESS SENSING DEVICE

FIELD OF THE INVENTION

This invention relates to the sensing of leaf thickness and in particular to the sensing of changes in leaf thickness, particularly for use in irrigation systems.

BACKGROUND OF THE INVENTION

Conventional irrigation systems are intended to periodically replenish accumulated soil water deficits which are associated inter alia with the water retention capacity of the soil, the type of the plants and environmental conditions.

Various proposals have been made and, in some cases implemented, to provide an irrigation system designed to be responsive to the water status of the soil. Thus, for example, it is known to monitor the relative humidity in the soil and to arrange for the irrigation system to be responsive to this relative humidity.

It is known that changes in the water status of a plant are reflected in dimensional changes in one or other of the plant's component elements such as leaves, stalks or stems, and fruits, etc. It has been proposed to monitor such changes and to arrange for periodic irrigation in response to such changes. Of these plant organs, it has been particularly proposed to utilize changes in a leaf's thickness for controlling an irrigation system seeing that it is believed that the instantaneous water status of a leaf of a plant as represented by its thickness provides an accurate indication of the instantaneous water status of the plant.

It is therefore clear that in order to provide for an efficiently operating irrigation system responsive to leaf thickness sensing, it is of prime importance to have available a reliable and efficient leaf thickness sensing device.

It is therefore an object of the present invention to provide a leaf thickness sensing device primarily for use in irrigation systems.

SUMMARY OF THE INVENTION

According to the present invention, there is provided a leaf thickness sensing device comprising mounting means for flexibly mounting said device adjacent a leaf whose thickness is to be sensed, a leaf support element coupled to said mounting means, a displaceable leaf abutting element juxtaposed with respect to and biased towards said leaf support element so as to be in firm, non-destructive abutting contact with a leaf to be releasably retained on said support element; a displacement transducer element responsibly coupled to said leaf abutting element and serving to generate a signal corresponding to displacement of said second element relative to said first element.

Preferably, the displaceable leaf abutting element is constituted by a cantilever mounted resiliently flexible strip whose tip is adapted to bear on the leaf so that leaf thickness changes give rise to corresponding changes in flexing of the strip, said transducer preferably comprising a strain gauge responsive to changes in flexing of the strip.

It is known that a leaf's thickness typically expands and contracts over 20–50 microns during the course of a solar day, i.e. from sunrise to sunrise and, consequently, the displacement transducer element which is responsive to the separation between the abutting elements has a sensitivity to variations in thickness in the order of ±1 micron.

When the device is incorporated in an irrigation system, the output of the transducer when coupled to an irrigation controller is effective in actuating the system in response to the sensed cyclic diurnal variations in leaf thickness which are related to the water status of the plant bearing the leaf.

The irrigation controller is programmed so as to ensure that the required amount of irrigation is provided in accordance with needs of the particular plant, a leaf of which is having its thickness variations sensed.

The invention is preferably associated with a drip irrigation system as this has been found to be particularly effective in providing a rapid localized irrigation water supply as required.

BRIEF DESCRIPTION OF THE DRAWING

For a better understanding of the invention and to show how the same may be carried out in practice, reference will now be made by way of non-limiting example, to the accompanying drawing which is a perspective view of a device for automatically sensing variations in the thickness of a leaf in situ in accordance with the present invention schematically shown as incorporated in an irrigation system.

DETAILED DESCRIPTION OF PREFERRED EMBODIMENT

Figure 1:
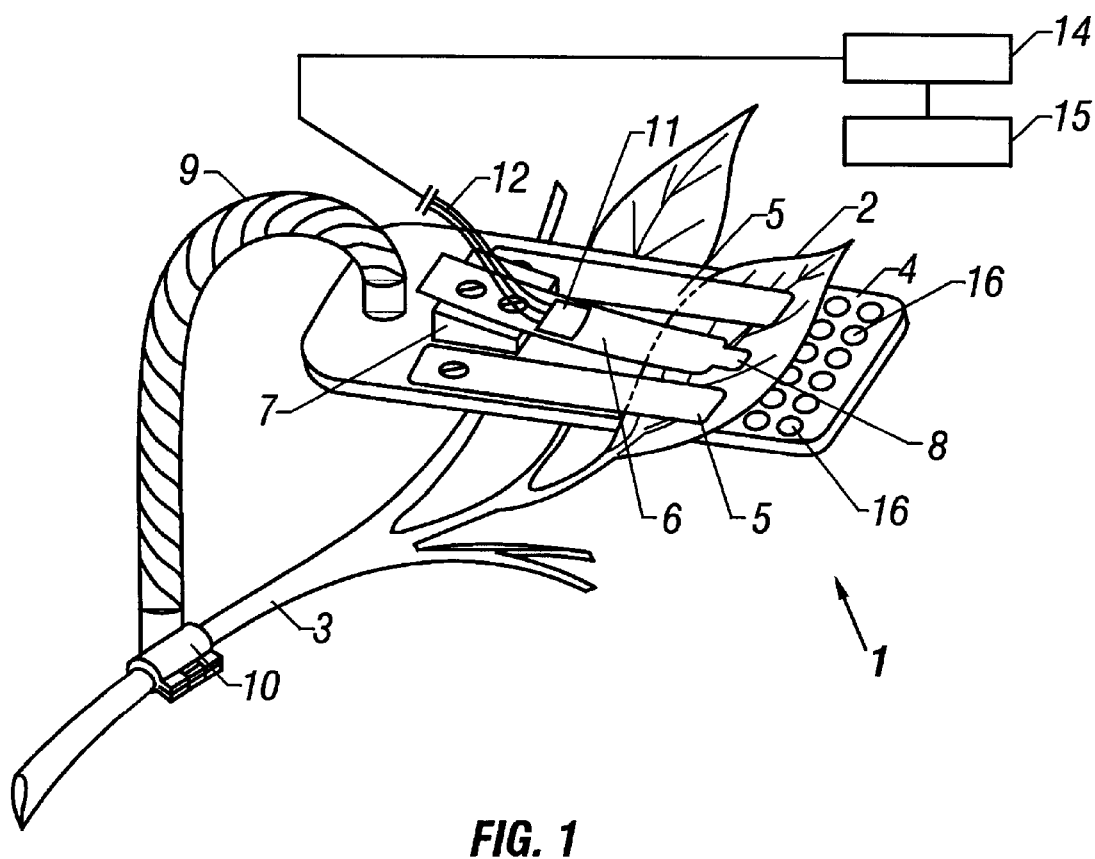

As shown in the FIGURE, a device 1 for sensing thickness variations of a leaf 2 growing from a twig 3 comprises a plate 4 (constituting a leaf support element). A pair of clamping strips 5 is mounted on the plate 4 and which serve, as shown, for firmly retaining the leaf 2 in position on the plate 4. Between the clamping strips is mounted, cantilever fashion, an elongated metallic strip 6 which, by virtue of being mounted on the plate 4 via an inclined mounting block 7, has its tip 8 effectively biased towards the plate 4 so as to bear on the leaf 2 with minimal pressure.

The device 1 is provided with mounting means in the form of a flexible arm 9 which is secured at one end to the plate 4 and is provided, at the other end, with a clamping collar 10 for securing to the twig 3.

A strain gauge 11 (constituting a displacement transducer element) is mounted on the strip 6 and has output wires 12 which are coupled to an irrigation controller 14 which in turn is responsively coupled to an irrigation control valve 15.

The plate 4 is formed with apertures 16 so as to ensure gas interchange between the retained leaf portion and the atmosphere.

In use, with the leaf retained on the plate 4 and the tip 8 of the strip 6 bearing thereon, variations in the thickness of the leaf result in variation in the degree of flexing of the strip 6, which in turn gives rise to variation in the output of the strain gauge 11. Calibration of the device is effected so as to correlate the output of the strain gauge 12 with variations in leaf thickness. In this way, the irrigation controller 14 receives signals which reflect thickness changes of the leaf 2, which in turn reflects changes in the water status of the plant The irrigation controller 14 is suitably programmed in accordance with predetermined irrigation regimes for the plants concerned so as to ensure opening and closing of the irrigation valve, in order to maintain the plant's water status at a required level.

As an alternative to the leaf thickness sensing device specifically described and illustrated above, other devices which are equally sensitive and responsive to such micronic changes in leaf thickness may be employed such as, for example, a device having a movable element bearing on the leaf, displacement of which gives rise to a corresponding displacement in a potentiometer type transducer.

In all cases, the device should be so designed so as not to interfere with light collection by the leaf, and in this connection components of the device can be formed of a translucent material.

The regulation of an irrigation system for an entire orchard using a single device 1 has been shown feasible in experimental work when the selected leaf, whose thickness is to be sensed, is located in the position representative of the statistical average of all the leaves in the orchard canopy. Such a leaf is typically 1 m from ground level, slightly disposed inward relative to the periphery of its tree's leaf canopy and oriented toward the sun in its mid-day position It has been found that the use of an irrigation system which is arranged to be responsive to micronic variations in leaf thickness results in improved crop yields and lower water consumption.

While the invention has been described with respect to a limited number of embodiments, it will be appreciated that many variations, modifications and other applications of the invention may be made.

What is claimed is:

1. A leaf thickness sensing device comprising mounting means for flexibly mounting said device adjacent a leaf whose thickness is to be sensed, a leaf support element coupled to said mounting means, a displaceable leaf abutting element juxtaposed with respect to and biased towards said leaf support element so as to be in firm, non-destructive abutting contact with a leaf to be releasably retained on said leaf support element; a displacement transducer element responsibly coupled to said leaf abutting element and serving to generate a signal corresponding to displacement of said second element relative to said first element.

2. The device according to claim 1, wherein said leaf abutting element is constituted by a metallic strip cantilever mounted on said support and adapted to bear at its tip with minimal pressure on the leaf and wherein said transducer comprises a strain gauge mounted on said strip and responsive to changes in flexing of the strip.

3. The device according to claim 1, wherein said leaf support element is provided with a grid of apertures.

4. The device according to claim 1, wherein said leaf support member is made of substantially translucent material.

5. An irrigation system comprising a leaf thickness sensing device according to any one of the preceding claims, an irrigation controller responsively connected to an output of said transducer and a main irrigation valve coupled to said controller and adapted to be actuated in response to sensed variations in said leaf thickness.

* * * * *

UNITED STATES PATENT AND TRADEMARK OFFICE
CERTIFICATE OF CORRECTION

PATENT NO.    : 6,185,833 B1
DATED         : February 13, 2001
INVENTOR(S)   : Yeshoshua Sharon, Ben-Ami Bravdo and Ron Seligmann It is certified that error appears in the above-identified patent and that said Letters Patent is hereby corrected as shown below:

Title page,
Item [75], please correct the spelling of the inventor from -- [Ron Seliemann] to -- Ron Seligmann. --

Signed and Sealed this

Eighth Day of January, 2002

Attest:

JAMES E. ROGAN
*Attesting Officer*   *Director of the United States Patent and Trademark Office*